G. GILBERT.
END GATE FASTENER FOR WAGON BODIES.
APPLICATION FILED SEPT. 8, 1915.
1,195,806.
Patented Aug. 22, 1916.
2 SHEETS—SHEET 1.
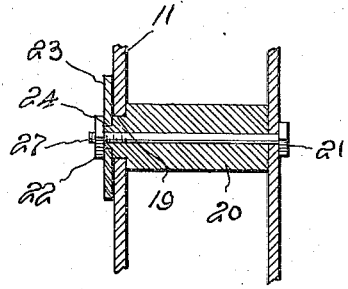
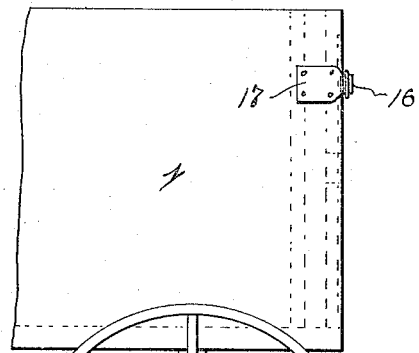
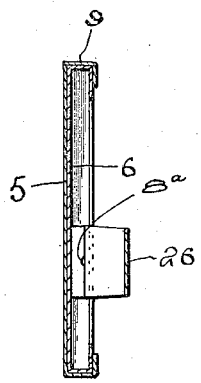
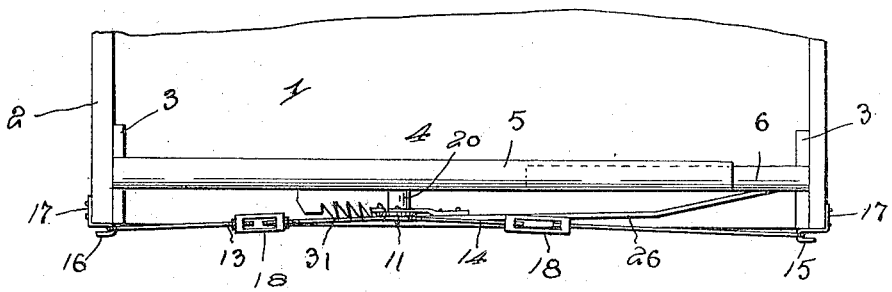
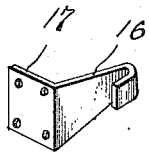
Witnesses
Inventor
Glen Gilbert.

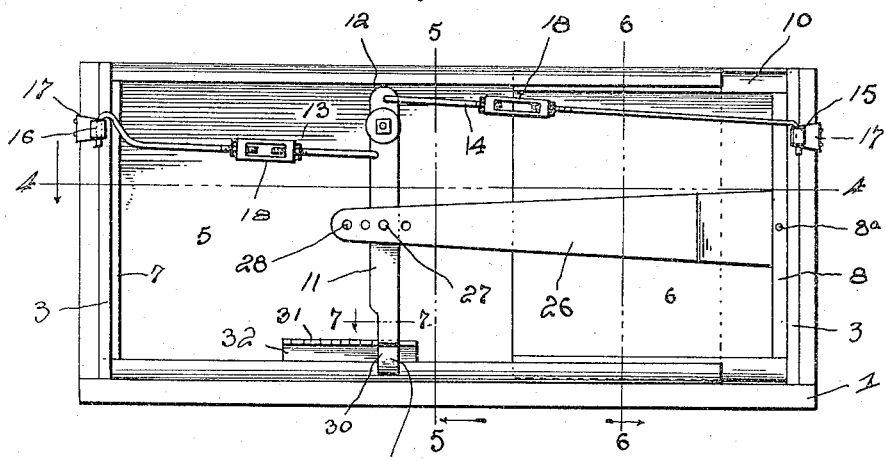
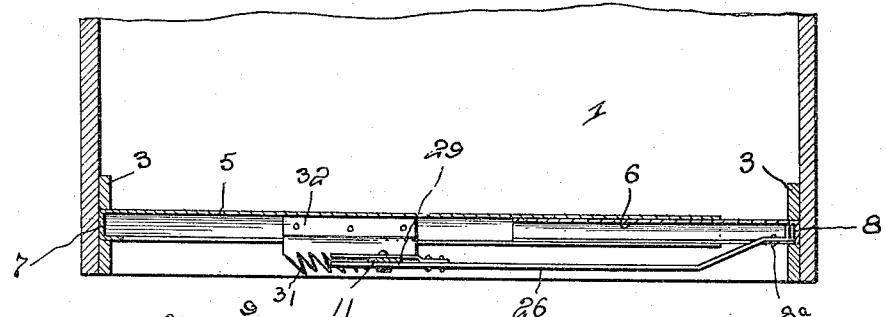
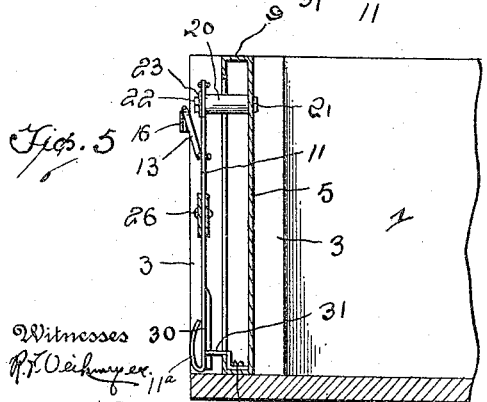

UNITED STATES PATENT OFFICE.

GLEN GILBERT, OF MIDDLETOWN, MISSOURI.

END-GATE FASTENER FOR WAGON-BODIES.

1,195,806.  Specification of Letters Patent.  Patented Aug. 22, 1916.

Application filed September 8, 1915. Serial No. 49,580.

*To all whom it may concern:*

Be it known that I, GLEN GILBERT, a citizen of the United States, residing at Middletown, in the county of Montgomery and State of Missouri, have invented certain new and useful Improvements in End-Gate Fasteners for Wagon-Bodies; and I do hereby declare the following to be a full, clear, and exact description of the invention, such as will enable others skilled in the art to which it appertains to make and use the same.

The invention relates to improvements in end gate fasteners for wagon bodies.

The object of the present invention is to improve the construction of end gates and fasteners for wagon bodies and to provide a simple, practical and comparatively inexpensive end gate and fastener of great strength and durability, capable of ready adjustment to suit wagon bodies of different widths and adapted to be easily and quickly placed in and removed from a wagon body without requiring the side space necessary for the removal of an ordinary end gate fastening rod, which must be drawn out endwise.

A further object of the invention is to provide an end gate fastener of this character in which both the inward and outward pressure will operate to maintain the fastener tightly in its engaging position so that neither inward or outward pressure against the sides of the wagon body will operate to loosen the end gate fastener.

A further object of the invention is to provide an end gate fastener in which all the parts will be carried by the end gate so that there will be no liability of any of the said parts becoming lost or misplaced.

The invention also has for its object to provide a metallic end gate adapted to be readily hammered back into shape should it become dented or bent through contact with the pole of another vehicle or the like.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a side elevation of a portion of a wagon provided with an end gate and fastener constructed in accordance with this invention, Fig. 2 is a plan view of the same, Fig. 3 is a rear elevation of the wagon body and end gate fastener, Fig. 4 is a horizontal sectional view on the line 4—4 of Fig. 3, Fig. 5 is a vertical sectional view on the line 5—5 of Fig. 3, Fig. 6 is a similar view on the line 6—6 of Fig. 3, Fig. 7 is a detail sectional view showing the operating lever engaging the ratchet plate, Fig. 8 is an enlarged detail sectional view illustrating the manner of mounting the operating lever, Fig. 9 is a detail perspective view of one of the side hooks.

Like numerals of reference designate corresponding parts in the several figures of the drawings.

In the accompanying drawings in which is illustrated the preferred embodiment of the invention, 1 designates a wagon body provided at the inner faces of its sides 2 with vertical cleats 3 arranged in pairs and forming guides or ways for an end gate 4 composed of two longitudinally slidable interlocked sections 5 and 6. The sections 5 and 6 which form an extensible or adjustable end gate to fit wagon bodies of different widths are constructed of sheet metal and are provided at their outer ends with integral approximately L-shaped flanges 7 and 8 and at their upper edges with integral approximately L-shaped flanges 9 and 10. The side and end flanges are secured together and they form relatively wide ends and upper and lower horizontal edges to enable the end gate to be conveniently handled and the said upper and lower flanges slidably engage each other, the flanges 10 of the section 6 fitting within the flanges 9 of the section 5. The sections are adapted to slide outwardly and inwardly on each other to vary the length of the end gate and also to withdraw them from the space between the vertical cleats or bars 3 of the sides of the wagon body.

Fulcrumed on the section 5 of the end gate is a substantially upright operating lever 11 pivoted near its upper end to provide a short upper arm 12 and connected above and below the pivotal point with the inner end of rods 13 and 14 and the latter extend to the opposite sides of the wagon body and are provided with terminal hooks 15 for engaging hooks 16 of the side 2 of the body. The side hooks 16 of the body consist of plates having attaching portions 17 secured to the outer faces of the sides of the wagon body and arranged at right angles to the shanks of the hooks 16 which project inwardly toward each other as clearly illustrated in Fig. 2 of the drawings. The rods 13 and 14 are composed of two sections or members adjustably connected by the turn buckles 18 which engage threaded terminals of the adjacent ends of the sections of the rods 13 and 14 in the ordinary manner. The turn buckle is adapted to be adjusted to vary the length of the rods 13 and 14 to adapt the locking or fastening means to wagon bodies of different widths.

The operating lever 11 which is provided at the lower end with a hand hold 11$^a$ is mounted on a reduced portion 19 of a sleeve 20 which is secured to the section 5 of the end gate by a bolt 21 extending through the sleeve and having a nut 22 at its outer end. The nut 22 engages the washer 23 which is arranged on an outer reduced portion 24 of the sleeve 20.

The sleeve is provided at its outer portion with two reductions forming shoulders to engage the operating lever and the washer. This construction enables the sleeve to be tightly clamped against the section 5 of the end gate without binding against the operating lever which has free pivotal movement to operate the rods 13 and 14 and also the sections of the end gate. The operating lever is pivotally connected at a point below its fulcruming pivot with an arm or bar 26 of the section 6 of the end gate by a bolt 27 adapted to be arranged in any one of a series of perforations 28 to position the operating lever on the arm or bar 26 to suit the width of the wagon body. The arm or bar 26 which is located midway between the upper and lower edges of the end gate is pivoted at its outer end to the flange 8 by a rivet 8$^a$ or other suitable fastening device and it has a forked end or portion 29 to receive the operating lever. The lower end of the operating lever is provided with a flange or lip 30 which is adapted to engage the teeth 31 of a ratchet plate 32 secured to the section 5 of the end gate at the bottom thereof. By this construction the lever is adapted to operate on both the slidable section of the end gate and the rods 13 and 14 and is maintained firmly in engagement with the ratchet plate by both internal and external pressure against the sides of the wagon body. While the ratchet plate is shown provided with a plurality of ratchet teeth or notches, only a single notch is necessary when a pair of turn buckles is employed for connecting the sections of the rods 13 and 14.

When it is desired to remove the end gate from the wagon body, the lower end of the operating lever is disengaged from the ratchet plate and the lower arm is swung to the left which extends the side engaging rod and at the same time withdraws the right hand end of the end gate from the recess within the vertical bars or cleats 3 of the right side of the wagon body. The end gate is then adapted to be swung outwardly which movement will cause the left hand rod to disengage itself from the left hand hook and as soon as the rod 13 drops out of engagement with the left hand hook the end gate is pulled out. In replacing the end gate, it is arranged in the grooves or recesses formed by the vertical bars or cleats 3 and the rods 13 and 14 are engaged with the hooks of the sides of the wagon body. The lower end of the lever is then swung to the right and engages with the ratchet plate. The lever acts through both the slidable sections and the rods and firmly is maintained in engagement with the ratchet plate so that there is no liability of the end gate becoming accidentally unfastened or lost. The ratchet plate is provided with an approximately L-shaped flange 33 which is riveted or otherwise secured in the groove of the bottom flange of the section 5. The outer end of the arm or bar 26 is angularly bent to form a brace which bears against the section 6 of the end gate and relieves the rivet 8$^a$ of strain.

What I claim is:—

1. The combination of an end gate composed of extensible sections adapted to fit against the sides of a wagon body at the inner face thereof, transverse rods or members designed to be connected at their outer ends with the sides of the wagon body, an operating lever mounted on one section and connected with the other, said lever being also connected with the rods or members and arranged to move the same and the sections in opposite directions, and means for locking the lever in its adjustment.

2. The combination of an end gate composed of extensible sections adapted to fit against the sides of a wagon body at the inner face thereof, transverse rods or members designed to be connected at their outer ends with the sides of the wagon body, an operating lever mounted on one section and connected with the other, said lever being also connected with the rods or members and arranged to move the same and the sections in opposite directions, and a ratchet plate mounted on one of the sections and arranged to be engaged by the lever, the latter being maintained in such engagement by both internal and external pressure against the sides of the wagon body.

3. The combination of an end gate composed of slidably connected extensible sections adapted to engage the sides of a wagon body at the inner faces of the same, transverse rods or members designed to be connected with the sides of the wagon body, a lever fulcrumed intermediate of its ends and connected at opposite sides of the fulcrum point with the said rods or members, said lever being carried by one of the sections of the end gate, means for connecting the lever with the other section of the end gate and means for securing the lever in its adjustment.

4. The combination of an end gate composed of slidably connected extensible sections adapted to engage the sides of a wagon body at the inner faces of the same, transverse rods or members designed to be connected with the sides of the wagon body, a lever fulcrumed intermediate of its ends and connected at opposite sides of the fulcrum point with the said rods or members, said lever being carried by one of the sections of the end gate, an arm extending from the other section of the end gate and connected with the lever and means for securing the lever in its adjustment.

5. The combination with a wagon body provided at opposite sides with rigid hooks, of an end gate composed of extensible sections fitting against the wagon body at the inner faces of the sides, a lever fulcrumed on one of the sections, an arm extending from the other section and connected with the lever, and rods or members disposed transversely of the body and connected at their inner ends with the lever at opposite sides of the fulcrum point and provided at their outer ends with means for engaging the hooks of the body.

6. The combination of an end gate composed of two slidably connected sections, a substantially horizontal arm pivoted at one end to one of the sections at the outer end thereof a lever fulcrumed at a point intermediate of its ends on the other section, means for pivotally connecting the lever with the said arm and means located at opposite sides of the fulcrum point of the lever for connecting the same with the sides of a wagon body.

In testimony whereof I affix my signature in presence of two witnesses.

GLEN GILBERT.

Witnesses:
JAMES R. DUNN,
JOSEPH K. COBB.

Copies of this patent may be obtained for five cents each, by addressing the "Commissioner of Patents, Washington, D. C."